United States Patent [19]

Sierens et al.

[11] Patent Number: 5,500,755
[45] Date of Patent: Mar. 19, 1996

[54] COMPENSATION DEVICE

[75] Inventors: Christiaan H. J. Sierens, Kontich, Belgium; Ulrich Steigenberger, Stuttgart, Germany; Werner Berger, Ditzingen, Germany; Stephen Harnisch, Stuttgart, Germany; Gert Van Der Plas, Merchtem; Denis J. G. Mestdeagh, Brussels, both of Belgium

[73] Assignee: Alcatel SEL Aktiengesellschaft, Stuttgart, Germany

[21] Appl. No.: 228,729

[22] Filed: Apr. 18, 1994

[30] Foreign Application Priority Data

Apr. 27, 1993 [EP] European Pat. Off. ............... 93201222

[51] Int. Cl.$^6$ .................................................. H04B 10/18
[52] U.S. Cl. ........................... 359/161; 359/153; 359/188
[58] Field of Search ...................... 359/153, 161, 359/173, 188, 194, 195, 140

[56] References Cited

U.S. PATENT DOCUMENTS

| | | | |
|---|---|---|---|
| 5,299,044 | 3/1994 | Mosch | 359/161 |
| 5,302,922 | 4/1994 | Heidemann et al. | 333/18 |
| 5,317,441 | 5/1994 | Sidman | 359/161 |
| 5,327,277 | 7/1994 | Van Der Plas et al. | 359/140 |
| 5,353,285 | 10/1994 | Van Der Plas et al. | 370/84 |

FOREIGN PATENT DOCUMENTS

| | | | |
|---|---|---|---|
| 0197263 | 10/1986 | European Pat. Off. | 359/161 |
| 0521342 | 6/1992 | European Pat. Off. | |
| 0521197 | 1/1993 | European Pat. Off. | |
| 0190436 | 11/1982 | Japan . | |
| 4255124 | 9/1992 | Japan | 359/161 |
| 8809093 | 11/1988 | WIPO | 359/161 |

OTHER PUBLICATIONS

"Optical Equalization to Combat the Effects of Laser Chirp and Fiber Dispersion", L. Cimini, Jr. etal, *IEEE Journal of Lightwave Technology*, vol. 8, No. 5, May 1990, pp. 649–659.

"Electrical Predistortion to Compensate for Combined Effect of Laser Chirp and Fibre Dispersion", H. Gysel et al, *Electronics Letters*, vol. 27, No. 5, Feb. 28, 1991, pp. 421–423.

*Primary Examiner*—Leslie Pascal
*Attorney, Agent, or Firm*—Ware, Fressola, Van Der Sluys & Adolphson

[57] ABSTRACT

The compensation device is used in an optical network where signals are transmitted from a main station (M) to one or a plurality of user stations (US1 to US3). It compensates for analog optical signal distortion caused by laser chirp of a laser in the main station (M) which generates said analogue optical signal and fiber dispersion of the fiber link over which the optical signal is transmitted. The device includes a distance measuring device (R) generating a result signal (MS) indicative of the distance between the main station and the user stations and which is possibly already available in the network to perform ranging when the latter network is also used to transmit digital signals from the user stations to the main station using Time Division Multiple Access. It also includes a processing circuit (PC) which in response to a given laser chirp and the result signal, provides a tuning signal (V) to tune the bias voltage of a varactor diode (VD) which is part of the compensation circuit inserted in the electrical signal path. In an optimal implementation the measuring device (R) and the processing circuit (PC) are located in the main station (M), while the varactor diode (VD) is located in each user station.

9 Claims, 2 Drawing Sheets 5,500,755

COMPENSATION DEVICE

TECHNICAL FIELD

The present invention relates to a compensation device coupled to an optical fiber network a tunable compensation means-which is tuned so as to compensate for the distortion an analogue optical signal undergoes when being generated by a laser and transmitted over a distance through said fiber network, said distortion being caused by laser chirp of said laser and by fiber dispersion due to said transmission, and being dependent on said distance.

BACKGROUND OF THE INVENTION

Such a compensation device is already known in the art, e.g. from the article "Electrical predistortion to compensate for combined effect of laser chirp and fibre dispersion" by H. Gysel and M. Ramachandran and published in Electronic Letters of 28th Feb. 1991, Vol. 27, No. 5, pp. 421–423. Therein, the optical signal is transmitted from a sending station to a receiving station, and the tunable compensation means, more specifically a varactor diode, is tuned to compensate optimally for a predetermined distance between the sending and the receiving station. It is clear that whenever the transmission distance between these stations changes this distance has to be measured again and the tuning of the varactor diode by means of its bias voltage has to be adjusted to achieve optimum compensation.

DISCLOSURE OF INVENTION

An object of the present invention is to provide a compensation device of the above type where the tuning of the tunable compensation means and the adaption thereof in case of distance change or a change of laser chirp, is performed automatically and not by hand.

According to the invention, this object is achieved due to the fact that said compensation device moreover includes an automatic distance measuring device providing a result signal indicative of said distance, and a processing circuit which in response to said result signal and the value of said laser chirp provides a tuning signal for said tunable compensation means.

Another characteristic feature of the compensation device according to the present invention is that said fiber network is a passive optical network where a main station is connected to a plurality of user stations via a common link and a respective user link, said network being additionally used to transmit digital signals from said user stations to said main station and including a ranging device which determines for each of said user stations its distance over said network from said main station in order to schedule the access of said user stations to said network for said transmission of said digital signals, and that said ranging device comprises said distance measuring device.

In this way the ranging device which is anyway needed in the above network to be able to schedule, as mentioned, the access of the user stations to the network, can be used as distance measuring device, and, consequently, to realize the mentioned tuning in an automatic way in a network as the above one, the only additionally needed hardware is the processing circuit and the tunable compensation means.

To be noted that in such a network, the ranging is performed periodically, so that a change in the mentioned distance is always detected by the ranging device and can then be transmitted to the processing device for adjustment of the tuning signal when the change is important enough to require such an adjustment. Thereby the above mentioned automatic adjustment is provided.

Another characteristic feature of the compensation device according to the invention is that said processing circuit uses at least one table to convert the value of a predetermined characteristic of said result signal indicative of said distance into a value of said tuning signal, based on a predetermined value of said laser chirp.

As a consequence, given the length of the fiber over which the optical signal is transmitted, the tuning signal, usually a voltage signal, can be determined by the processing circuit for each possible value of the chirp. The value of this voltage signal is consequently automatically adapted whenever for instance a laser is replaced by another one with a different chirp value or when the length of the connecting fiber cable changes.

In an optimal embodiment of the compensation device the automatic distance measuring device and the processing circuit are located in the main station and the tunable compensation means is part of the user station. The measuring device then provides a result signal for each user station and the corresponding tuning signal is sent to the respective user station. However other configurations are possible. A processing circuit can be located in each user station together with a tunable compensation means, whilst the automatic distance measuring device is located in the main station. This implies that the result signal and the laser chirp value have to be transmitted to the respective user station and that the processing device has to be multiplied. Also, the complete compensation device can either be located in each user station or in the main station. However, in the former case this implies multiplication as well of the processing circuit as of the distance measuring device. In the latter case the tunable compensation means can only perform optimally for user stations for which the distance to the main station lays within a predetermined distance range, called distance window, for which that compensation means can be tuned to perform optimally. A plurality of tunable compensation means or one tunable compensation means tuned by a plurality of possible bias voltages has then to be used in the main station, i.e. one compensation means or one bias voltage for each distance window, to be able to send an optimally compensated signal to all the user stations. In such an embodiment, a selection circuit is needed to select the correct compensation means or the correct bias voltage, since the choice of the used compensation means or of the correct bias voltage then depends on the destination user station. To be noted that the last mentioned possible implementation is only applicable when the optical signals are not sent simultaneously to all users. As a consequence this implementation is not suited for transmission of CATV signals.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
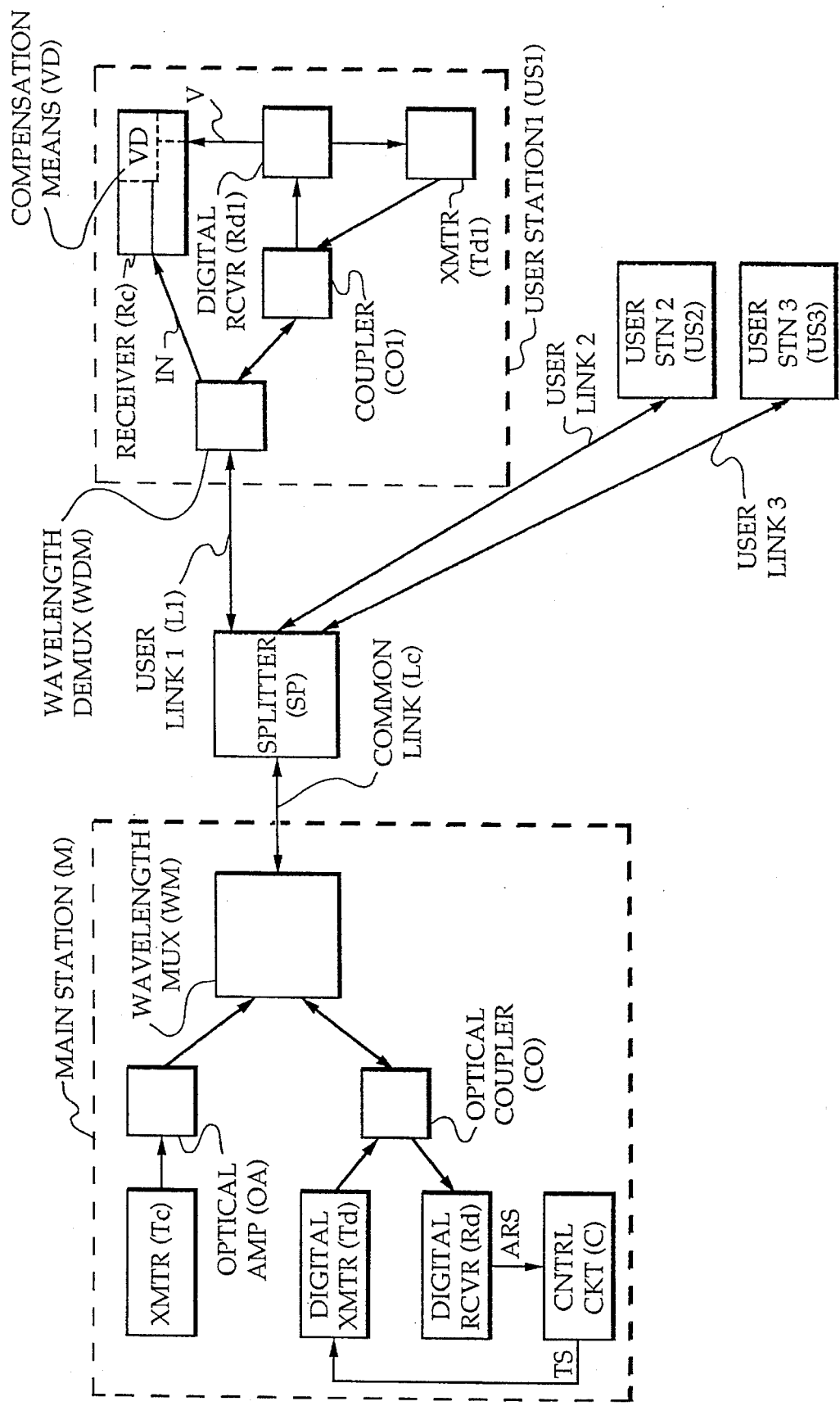
FIG. 1 shows an optical network wherein a compensation device (C, VD) according to the invention is used.

FIG. 1 shows a passive optical network connecting a main station M to three user stations US1 to US3 via a common optical fiber link lc, an optical splitter SP and respective user optical fiber links 11 to 13.

The main station (M) includes a transmitter Tc having a laser (not shown) for sending cable television (CATV) signals in optical format to US1, US2 and US3, as well as a digital transmitter Td and a digital receiver Rd for transmitting and receiving digital signals to and from US1 to US3 respectively. The digital signals are transmitted from US1, US2 and US3 to M using a Time Division Multiplexing Access (TDMA) method, as described in the not yet published European Patent Application 91870197.0 corresponding to U.S. patent application Ser. No. 07/983,876, now U.S. Pat. No. 5,353,285 entitled "Time Slot Management System", and particularly FIGS. 1–3, as described at page 3, line 27, through page 9, line 18, which is hereby incorporated by reference for background.

Both the digital and analogue optical signals are transmitted over the same link lc using wavelength multiplexing.

Tc and Td & Rd are coupled to a wavelength multiplexer WM via an optical amplifier OA and an optical coupler CO respectively and WM is connected to the optical splitter SP by lc.

The main station (M) additionally includes a control circuit c with an input ARS, at which a like named signal is received, and to which Rd is connected, and with an output TS connected to Td.

US1 to US3 are identical user stations of which only US1 is represented in more detail. It includes a wavelength demultiplexer WDM with an input connected to 11 and with an output connected on the one hand, via a link IN on which like named signals are received, to a receiver Rc for receiving the CATV signals, and on the other hand via a coupler CO1 with a digital receiver Rd1 and a digital transmitter Td1. Via a link V on which like named signals are transmitted, Rd1 is connected with Rc and more specifically with a tunable compensation means such as a varactor diode VD included therein. Rd1 is also connected to Td1.

To be noted that the network elements Tc, Td, Rd, CO, OA, WM, SP, WDM, Rc, Rd1, Td1 and CO1 are well known in the art. Therefore they are not described in detail.

Figure 2:
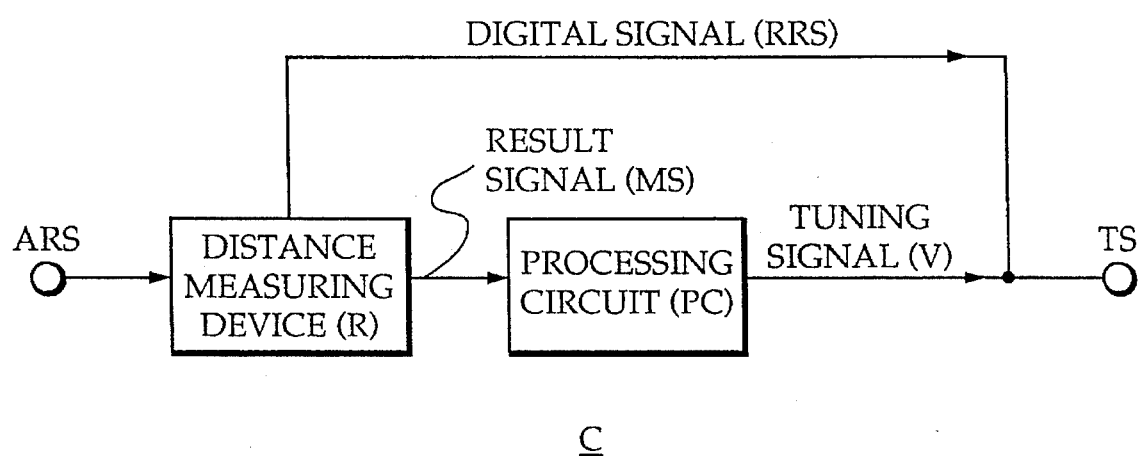
FIG. 2 represents the control circuit C of M of FIG. 1 in more detail.

The control circuit C of M is represented in more detail in FIG. 2. It includes a distance measuring device or more specifically a ranging circuit R which generates a signal RRS and to which a signal ARS is applied. R measures the distances between the main station (M) and the user stations US1 to US3 by means of the time delay between signals ARS and RRS and in the way described in the not yet published Europen Patent Application 91201355.4 corresponding to allowed U.S. patent application Ser. No. 07/893, 210, now U.S. Pat. No. 5,327,277 (see especially FIGS. 1–5 described at column 2, line 59 through column 8, line 21 thereof, which is hereby incorporated by reference for background). It supplies a result signal MS, indicative of the distance between the main station and a considered user station, to a processing circuit PC which generates a tuning signal V. V and RRS are transmitted to the user stations US1 via TS, Td, CO, WM, lc, SP and 11 as shown in FIG. 1. US2 and US3 receive the tuning signal and the ranging signal in a similar way.

PC is not described in further detail since its realization is obvious for a person skilled in the art, thanks to the following description of the working of the compensation device.

Due to chirp of the laser in Tc, an optical CATV signal generated by Tc has slightly varying wavelengths as a result of the varying amplitude of the corresponding electric signal applied to that laser. Due to fiber dispersion these varying wavelengths introduce varying delays of the optical signal after transmission through the fiber which are related to the mentioned varying amplitude. As a consequence, the signal is distorted after transmission.

More details about such distortion caused by laser chirp and fiber dispersion and about its compensation by using varactor diodes may be found in the earlier mentioned article and in the article from Leonard J. Cimini, Jr. et al. "Optical Equalisation to Combat the Effects of Laser Chirp and Fiber Dispersion" published in the Journal of Lightwave Technology, vol. 8, No 5 of May 1990, pp. 649–659.

The distortion of CATV signals sent by the main station M to the user stations US1 to US3 is compensated for by the varactor diodes included in the user stations, as described in the above article. These diodes are tuned by the signal V as described hereafter, using as references FIGS. 1 and 2. This tuning signal V is, as mentioned earlier, dependent on the distance between M and US1 to US3 and on the chirp value of the laser used in M. How this tuning is automatically performed is described for US1, this description being equally applicable to US2 and US3.

As described in detail in the second mentioned European Patent Application and corresponding U.S. patent application, the result signal MS which is indicative of the distance between M and US1, is determined by sending the digital signal RRS from Td to Rd1 of US1 via CO, WM, SP, WDM and CO1 and determining how long it takes for the response signal ARS generated by Td1 of US1 to reach Rd in M.

The MS signal is passed to the processing circuit PC which converts it to the value of a tuning voltage V using a (not shown) table which, when addressed by the above distance MS and a predetermined laser chirp value CV of the used laser Tc in M, provides a voltage value. The signal V which has a voltage characteristic indicative of the latter value is then transmitted to US1 where it is used to tune VD.

To be noted that the above table can for instance be obtained in an empirical way or can be generated by a software program of the processing circuit which determines the value of a voltage function having as parameters the mentioned distance and laser chirp, and this for each considered value of MS and CV.

Whenever either the laser chirp or the length of the fiber between M and US1 changes, new values of CV and/or of MS, as determined by R which periodically performs its ranging operation, are used in PC as input of the earlier mentioned table, and V is adapted accordingly. Thus the tuning of the varactor diode VD is adapted dynamicaly and automatically. As long as there is no change in the length of the fiber or in the laser chirp, there is no need to activate the use of the above mentioned table since the previously determined tuning signal can then still be used to tune the diode. Therefore the value thereof is stored in a not shown memory module. This value is retrieved and converted in a tuning signal each time a signal distortion is to be compensated for. Whenever the fiber length or the laser chirp changes, a new tuning signal is generated by PC using the table and the old value is overwritten in the memory module. The realization of the above storage and retrieval is not shown, nor described in detail since it is considered to be easy to carry out for a person skilled in the art.

It has to be noted that there is no need for adaption of the tuning in case of small distance variations since VD works optimally for a predetermined window of distances, i.e. for user stations located within a predetermined distance range the same tuning voltage is used to tune their respective varactor diodes.

Also to be noted that, as mentioned earlier, the complete device could be located either in the main station or in each user station, or that a processor circuit could, together with the varactor diode, be located in each user station. However, these configurations have some important, earlier mentioned, disadvantages with respect to the described one.

While the principles of the invention have been described above in connection with specific apparatus, it is to be clearly understood that this description is made only by way of example and not as a limitation on the scope of the invention. Likewise although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Compensation device coupled to an optical fiber network and including a tunable compensation means (VD) which is tuned so as to compensate for the distortion an analog optical signal undergoes when being generated by a laser and transmitted over a distance through said fiber network, said distortion being caused by laser chirp of said laser and by fiber dispersion due to said transmission, and being dependent on said distance, wherein said compensation device moreover includes an automatic distance measuring device (R) providing a result signal (MS) indicative of said distance, and a processing circuit (PC) having a stored function indicative of laser chirp of said laser as a function of distance and which in response to said result signal provides a tuning signal (V) for said tunable compensation means.

2. Compensation device according to claim 1, wherein said fiber network is a passive optical network where a main station (M) is connected to a plurality of user stations (US1, . . . , US3) via a common link (lc) and a respective user link (l1; . . . ; l3), said network being additionally used to transmit digital signals from said user stations to said main station and including a ranging device which determines for each of said user stations its distance over said network from said main station in order to schedule access of said user stations to said network for said transmission of said digital signals, and wherein said ranging device comprises said distance measuring device (R).

3. Compensation device according to claim 2, wherein said processing circuit (PC) uses at least one table to convert a value of a predetermined characteristic of said result signal (MS) indicative of said distance into said tuning signal (V), based on a predetermined value of said laser chirp.

4. Compensation device according to claim 3, wherein said processing circuit includes a memory module wherein the value of said tuning signal is stored, said value being retrieved for said tuning each time one of said analog optical signals is transmitted and said conversion being activated to provide a new tuning signal at least when either said distance or said laser chirp changes, said stored value then being overwritten by the value of said new tuning signal.

5. Compensation device according to claim 2, wherein said optical signal is transmitted from said main station to each of said user stations.

6. Compensation device according to claim 5, wherein at least part (VD) of said compensation device (C,VD) is located in each of said user stations.

7. Compensation device according to claim 6, wherein said distance measuring device (R) and said processing circuit (PC) are located in said main station, while each of said user stations includes a said tunable compensation means, said tuning signal (V) being transmitted to each of said user stations over said network.

8. Compensation device according to claim 6, wherein said distance measuring device (R) is located in said main station, while said processing circuit includes a plurality of processing subcircuits each of which is located in a corresponding one of said user stations which additionally includes a said tunable compensation means, said result signal (MS) being transmitted to each of said user stations over said network.

9. Compensation device according to claim 5, wherein said optical signal is a cable television (CATV) signal.

* * * * *

UNITED STATES PATENT AND TRADEMARK OFFICE
CERTIFICATE OF CORRECTION

PATENT NO. : 5,500,755
DATED      : March 19, 1996
INVENTOR(S): Sierens et al

It is certified that error appears in the above-indentified patent and that said Letters Patent is hereby corrected as shown below:

At INID [75], line 7, please cancel "Mestdeagh" and substitute --Mestdagh-- therefor.

At column 3, line 2, please cancel "11 to 13" and substitute --11 to 13-- therefor;

at line 24, please cancel "circuit c" and substitute --circuit C-- therefor; and at line 29, please cancel "11" and substitute --11-- therefor.

Signed and Sealed this

Fifteenth Day of July, 1997

Attest:

BRUCE LEHMAN

*Attesting Officer*   *Commissioner of Patents and Trademarks*